United States Patent [19]

Štol et al.

[11] 3,988,305

[45] Oct. 26, 1976

[54] METHOD OF PRODUCING SOLUBLE GLYCOL METHACRYLATE OR GLYCOL ACRYLATE POLYMERS AND COPOLYMERS CONTAINING A MINOR AMOUNT OF DIESTER CROSSLINKING COMONOMERS

[75] Inventors: Miroslav Štol; Vladimír Stoy; Zdeněk Tuzar, all of Prague, Czechoslovakia

[73] Assignee: Ceskoslovenska akademie ved, Prague, Czechoslovakia

[22] Filed: Jan. 2, 1975

[21] Appl. No.: 538,154

Related U.S. Application Data

[63] Continuation of Ser. No. 297,389, Oct. 13, 1972, abandoned.

[30] Foreign Application Priority Data

Oct. 14, 1971 Czechoslovakia ................. 7233-71

[52] U.S. Cl. .................................. 526/79; 526/194; 526/206; 526/208; 526/210; 526/213; 526/263; 526/271; 526/272; 526/303; 526/310; 526/317; 526/318; 526/328; 526/329; 526/342; 526/347

[51] Int. Cl.$^2$............... C08F 218/00; C08F 220/00; C08F 222/00; C08F 224/00

[58] Field of Search .................. 260/86.1 E, 86.1 N, 260/80.81, 80.80, 80.73, 80.72, 80.76, 80.75, 78.5 R, 78.5 BB, 80.78

*Primary Examiner*—Joseph L. Schofer
*Assistant Examiner*—Herbert J. Lilling

[57] ABSTRACT

A starting monomer mixture containing a minor amount of a cross linking agent is precipitation polymerized in a diluent/precipitant which is an unlimited solvent for the starting monomers but is neither a solvent or a substantial swelling agent for the resultant polymer. The amount of cross linking agent is maintained during polymerization at a critically low percent by volume relative to the entire polymerization mixture. The resultant product falling from the polymerization contains substantially only soluble hydrophilic polymers and copolymers.

18 Claims, 3 Drawing Figures

3,988,305

METHOD OF PRODUCING SOLUBLE GLYCOL METHACRYLATE OR GLYCOL ACRYLATE POLYMERS AND COPOLYMERS CONTAINING A MINOR AMOUNT OF DIESTER CROSSLINKING COMONOMERS

This is continuation application of Ser. No. 297,389, filed Oct. 13, 1972, now abandoned.

BACKGROUND OF INVENTION

The present invention relates to a method of preparing soluble glycol methacrylate or glycol acrylate polymers and coplymers.

This application is a companion to our copending application Ser. No. 297,390 filed on even date hereof, also based on Czech. Application No. 7234/71, wherein there has been disclosed a method of forming polymer products and copolymer products of a type similar to that of the present invention but containing both soluble and non-soluble portions. Reference to the copending application is made as if more fully set forth for such definitions of terms, materials, monomers, cross-linking agents, diluents, solvents, etc. as may be required.

Polymers of the above type are usually prepared by free-radical solution polymerization in which a solvent for both the starting components and the resulting polymer product is used. (See U.S. Pat. No. 3,578,946). N,N-dimethyl formamide, dimethyl sulfoxide, pyridine, lower glycols, lower glycol monoethers, lower aliphatic alcohols and acids, etc., are examples of the suitable solvents. In the case of glycol monomethacrylate or glycol monacryate copolymers having other monoolefinic monomers, such as methyl methacrylate, styrene, vinyl acetate, acrylonitrile, the solvents may differ although they always are a solvent which unlimitedly dissolves the resulting polymer product.

The method of production mentioned above, has an undeniable advantage in enabling the preparation of completely soluble polymer products, even in the presence of large amounts of cross-linking comonomer, e.g. ethylene glycol-bis-methacrylate, and even if a high conversion is achieved. However, a disadvantage lies in the fact that it is rather difficult to isolate the polymer product from the solution, after the polymerization process is finished. Although it is sometimes possible, for some technical applications, to use the polymer solution directly after completing the polymerization process and without isolation of the polymer product from this solution, for a majority of other conventional applications however it is necessary to clean out the polymer product, precipitating it with a suitable precipitating agent, or evne isolate it in the form of a dry fine powder.

Precipitation of the polymer product is generally achieved by a large excess of the precipitating agent (about a tenfold amount to the volume of the polymer solution), and it is true, under vigorous stirring. Large volumes of the precipitating agents, often very volatile and violently inflammable organic liquids (e.g. diethyl ether) require great space, and in addition they increase production costs. Additional working operations are normally required such as separation of the polymer precipitated from the precipitating bath, drying the polymer and subsequently disintegrating it into finer particles.

Drying of the polymer product may be performed under precise and gentle conditions only, best at room temperature, and with the use of vacuum. Otherwise, at a higher temperature (above 80° C), for example, the polymer particles may agglomerate into bigger bits, or pieces and may even be converted into an undesirable insoluble form, as a result of the additional cross-linking. In some cases it is possible to use pure water as the precipitating agent for the polymer product. This may appear at first as very advantageous in comparision with more expensive, and inflammable organic liquid-precipitating agents. In reality, however, great difficulties occur in keeping large quantities of water in the swollen polymer particles, and it must be pointed out, that subsequent removal of this water is not easy. In the latter system, in the beginning of the drying process alone, a thin glassy layer is formed on the surface of the polymer particles, which inhibits further water evaporation from within the middle of these particles, and thus hinders the drying process and causes it to go on at an unreasonable rate.

The disintegration of larger particles, most often performed by milling, is also a rather expensive operation, and in addition, the resultant product is often contaminated with small foreign bodies, e.g. dust, metal, and the like.

It is the object of the present invention to provide a method of producing a soluble polymer which overcomes the difficulties of the prior art.

It is another object of the present invention to provide a method for producing completely soluble glycol methacrylate or glycol acrylate polymers or copolymers wherein a starting monomer or the monomer mixture having a minor amount of a cross-linking agent such as a corresponding glycol multifold-methacrylate or glycol multifold-acrylate monomer, which represent a conventional, but often undesirable admixture of corresponding monoesters, is combined with a diluent and polymerized under free-radical conditions in such a way, that the concentration of the multifold esters in the whole polymerization mixture including diluent decreases under the critical limit of 0.02 percent by volume. The diluent comprises a solvent unlimitedly dissolving all starting components but being neither a solvent for, nor an agent substantially swelling the resulting polymer product.

The proper polymerization process is performed by the precipitating technique, well-known itself, which in comparison with a free-radical solution polymerization has many advantages among which is an increased speed of polymerization in the entire range of conversion of the monomers to the polymer product; obtaining of fine discrete polymer particles of about 1 $\mu$ size capable of isolation from the polymerization mixture, by filtration or centrifugation or the like; and a product which is easy to dry into a fine polymer powder at relatively low production cost. (See FIG. 1).

The appendant graphs correspond to those given in the copending application, reference to which is made for a detailed explanation of the monomers, materials and polymerization process followed, as well as for an explanation of the symbols employed.

The present invention provides for the production of completely soluble polymers or copolymers of glycol monomethacrylate or monoacrylate even in the presence of the corresponding cross-linking comonomers, such as the multifold esters of more than a univalent alcohol such as glycol methacrylate or glycol acrylate mentioned above and in the companion application.

It has been verified experimentally as seen from the copending application, that the precipitating solution polymerization of the glycol monomethacrylate or the glycol monoacrylate, in the presence of the corresponding multifold esters, gives rise to insoluble portions comprising microgels in the polymer product. The quantity of such insoluble microgels depends on the amount of the corresponding cross-linking comonomers in the starting polymerization mixture as is evident from the graphic representation in FIG. 2, in which the dependence of the methanol-soluble poly (ethylene glycol monomethacrylate) on the amount of the cross-linking ethylene glycol dimethacrylate in the whole starting polymerization mixture, is plotted, (with dilution 90% by volume of di-n-butyl ether [1], — 90% by volume of chloroform [2].

Figure 2:
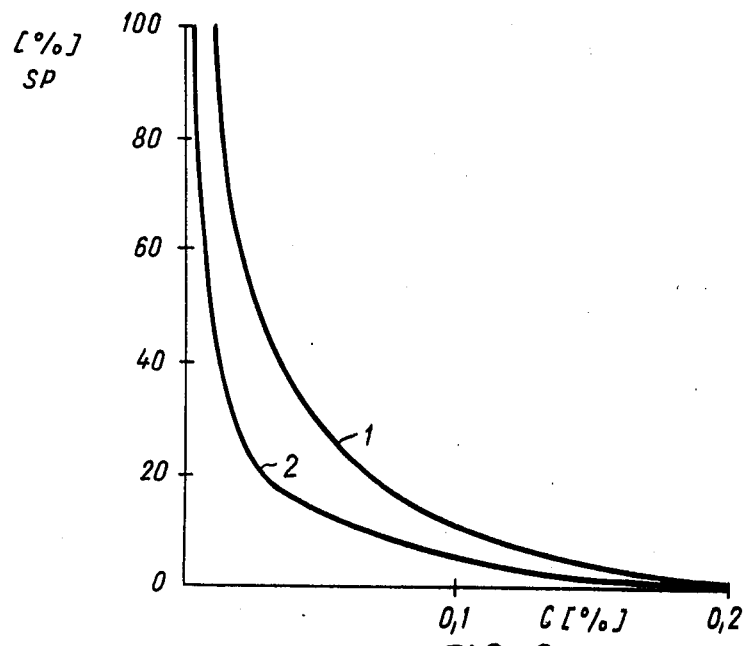
FIG. 2 is a graph showing the effect of the concentration (C) of cross-linking agent with a constant dilution of the polymerization mixture on the portion of the soluble polymer (SP) obtained in the present invention, employing two different diluting agents.

As seen in FIG. 2, the critical concentration of the cross-linking comonomer is limited to approximately 0.05% by volume of the monomer mixture. Under this concentration limit the completely soluble (in its typical solvents) polymer product is formed. This limit is, however, unfortunately very low, and from the technological point of view thus extremely unfavorable. Better results may be achieved, if chloroform is used as the diluting agent in the precipitating polymerization, in comparision with the di-n-butyl ether mentioned above, since the larger parts of the methanol-soluble polymer are in accordance with well-known facts of the kinetic chain-transfer dissolved into solvent. However, even with the use of a better chain-transfer agent, such as even bromoform, the critical concentration of the cross-linking agent in the whole polymerization mixture is relatively very low, i.e. about of 0.05% by volume, and the resulting polymer product has, in addition to it, a very low molecular weight. Thus it is not suitable for the standard applications of these polymers.

For a majority of the other diluting agents, which have the above-mentioned properties, the critical concentration is even lower, and varies between 0.01 to 0.02% by volume of the cross-linking agent in the whole polymerization mixture. Herein, aromatic hydrocarbons (benzene, toluene, xylene), other chlorinated hydrocarbons (e.g. tetrachloro methane) could be mentioned; an enumeration of other suitable diluting agents will be given further in the description and may also be seen from the companion application.

The practical consequence of this low critical concentration of the cross-linking agent in the polymerization mixture is, that the starting monomer mixture of glycol monomethacrylate or glycol monoacrylate monomer must be either, nearly completely deprived of the cross-linking agent, which is a very expensive operation, or to be diluted to a large extent, that the amount of the cross-linking agent must be decreased under the above-mentioned critical concentration. A large dilution is, however, technologically very disadvantageous since it increases the required volume of the polymerization reactors, and consumes large amounts of solvents, all of which leads to the increase of production costs per production unit of the polymer product.

According to the present invention a solution to this problem has been obtained. It consists in providing a precipitation polymerization process in which the combining starting mixture of a monomer or the monomer mixture containing the respective cross-linking comonomers with the diluent, in such a manner, that there is maintained a concentration of the cross-linking comonomer substantially automatically at a level, beneath a critical concentration wherein its cross-linking character has no effect on the polymerization. The diluent comprises a solvent unlimitedly dissolving all of the comonomers of the starting mixture but neither dissolving or acting as an agent to substantially swell the resultant polymer or copolymer. The critical limit is below a level of concentration of 0.02% by volume of the entire polymerization mixture (including diluent) and preferably below 0.02%. Further in accordance with the present invention the combining of the monomer mixture with the diluent is achieved by continuously or intermittently charging the monomer with the diluent in gradual and small doses so that even if the starting mixture has a high concentration of the cross linking agent the concentration in the polymerization mixture will be held below the critical level. Still further it is preferred that the charging be accomplished at a rate equal substantially to the rate at which the polymer products are precipitated in the polymerization.

The precipitating process of the polymerization permits the cross-linking comonomer to be consumed in the course of the polymerization, and to fall out together with the main monomer or the monomer mixture, in the form of an inert polymer product. The instantaneous concentration in the polymerization zone enables the above-mentioned critical level to be maintained even while additional monomer or monomer mixture is continually added. Precipitating polymerization is a relative fast chemical process, and thus in a relatively short time it is possible to prepare a sufficient quantity of the polymer product (completely soluble in its typical solvents, e.g. lower aliphatic alcohols), and in much greater proportions. In respect to the quantity of the inert diluting agent used. In comparison to the one-stage batch process, where a big dilution of the starting monomer must be used, the present invention has decided advantage.

According to the present invention it is thus possible to utilize the glycol monomethacrylate or glycol monoacrylate monomers, even with a higher amount of corresponding cross-linking comonomers, i.e. commercial monomers of a conventional technical degree of purity either undiluted or diluted by suitable diluting agents, as they customary can be found on the market.

It may be advantageous first to dilute the starting monomers by some portion of a diluting agent in order to obtain easy and quick dispersment of these monomers into the entire volume of the polymerization mixture, and in order to maintain the instantaneous concentration of the cross-linking comonomer under the critical limit. The quantity of the monomer in this partly diluted mixture may be within a range 25 to 50% by volume, however, this is not a critical condition. If a sufficient dispersion of the monomer in the polymerization zone is secured, e.g. by stirring, then it is not necessary to dissolve the monomer or the monomer mixture prior to the addition, but it may be added directly in small portions into the polymerization reactor., in accordance with the amount of the polymer product falling out.

According to the invention it is possible to use both discontinuous or continuous processes of production. For a large quantity of the polymer product produced is, of course, more suitable to employ a continual process in which in practice the polymer product falling out together with a part of the diluting-precipitating agent is continuously removed, the polymer product of both, the precipitating agent, and the unreacted monomer is separated (either, by filtration or centrifugation), and the recuperated precipitation agent is returned together with the rest of the unreacted monomer, to the beginning or initial stage of the polymerization process. The polymer product is easily cleaned directly, either on the filter or in the centrifuge by rinsing with a small quantity of the pure diluting-precipitating agent, which may also compensate for any possible loss in the production cycle (particularly during the drying process of the polymer product and the like).

The discontinual manner of production can be accomplished by the use of a reactor apparatus, where the polymer product gradually falls out of the polymerization zone (the upper part of the reactor) accumulates on the bottom of the polymerization reactor in a quantity which should not exceed about 50% by volume of the reactor. It may be expedient to leave the polymerization process to run down without a further addition of the monomer or the monomer mixture. The separation of the polymer product of the precipitating agent may again be done by filtration or centrifugation, and the regenerated precipitating agent may be preferably utilized again in the further charge of the reactor.

As used herein the term "glycol" means not only the basic ethylene glycol but also other polyols, such as e.g. diethylene glycol, triethylene glycol, and higher polyethylene glycols, as well as, 1,2-propylene glycol, and 1,4-butylene glycol, and also even other polyhydroxy compounds, such as e.g. glycerol, pentaerythrite, mannitol, sorbitol, and similar compounds.

In commerical production of these monomers a certain quantity of the multifold esters (multi-function comonomers) is produced, which, as is well known, act as cross-linking agents in subsequent polymerization, and their presence in the monomers is usually undesirable. The synthesis of these monomers is performed technologically in two basic ways, either by addition reaction of ethylene oxide onto methacrylic acid, or by transesterification of the respective alkylester (usually methylester) by the corresponding glycol. In the addition reaction of ethylene oxide into methacrylic acid an inert diluting agent (most usually xylene) is used, and a crude monomer in this solution is obtained. This crude monomer could be utilized directly in the present invention after only a small treatment by which catalyst, inhibitor, and free methacrylic acid are removed. Thus the most expensive step in commercial production, i.e. the distillation of the monomer, could be omitted. Further, it is not necessary to decrease the amount of the cross-linking comonomer present (ethylene glycol dimethacrylate) by extraction. In the transesterification process of alkylmethacrylates or alkylacrylates (e.g. methylmethacrylate) by glycol (e.g. ethylene glycol) it is necessary to remove the catalyst (strong bases or acids), the inhibitor, and the unreacted starting components. After diluting of the crude product with water, it is extracted usually by a light fraction of gasoline (petrolether, hexane, and similar) which removes the unreacted alkylmethacrylate or alkylacrylate, and an essential portion of the cross-linking agent. Then the monomer is salted out of an aqueous solution, and extracted with a suitable solvent (substantially immiscible with water), most usually with aromatic hydrocarbon (e.g. toluene), or chlorinated hydrocarbon (e.g. tetrachloromethane). The solvents are then distilled out, and the crude monomer distilled in vacuuo. For use in the present invention, it is possible to omit completely the very expensive distillation procedure, and proceed directly with the solution of the crude monomer in the respective extracting agent.

For the extraction, however, such solvents which either unlimitedly dissolve or are to a great extent miscible with water (e.g. acetone, methyl-ethyl ketone, tetrahydrofurane, and similar) are not suitable.

In addition to the above-mentioned monomers having the base of glycol methacrylates or glycol acrylates (a mixture of the main monomer i.e. monoester, and the comprising respective cross-linking agent) it is possible to use according to the present invention other comonomers. These other comonomers can be divided into two basic groups: (1) monomers which behave like the glycol monomethacrylate or the glycol monoacrylate, i.e. monomers which are unlimitedly soluble in the diluting agent used, but which polymers thereof are neither soluble nor swellable to a substantial extent in the diluting agent. Herein, for instance, can be named the unsaturated carbonic acids, such as methacrylic acid, acrylic acid, itaconic acid, citraconic acid; further, amides of these unsaturated carbonic acids, such as acrylamide or methacrylamide; aminoalkyl methacrylate or aminoalkyl acrylate, such as aminoethyl methacrylate; N-alkylaminoalkyl methacrylate or acrylate, such as N-methylaminoethyl methacrylate; N,N-dialkylaminoalkyl methacrylate or acrylate, e.g. N,N-dimethylaminoethyl methacrylate; further N-vinylpyrrolidone and C-substituted N-vinylpyrrollidone, and other similar compounds which are capable of free-radical polymerization and which produce polymers having hydrophilic character. These hydrophilic comonomers in mixtures together with the above-mentioned glycol methacrylates or glycol acrylates can be used, in the precipitation polymerization in any arbitrary proportion, in accordance with the required properties of the copolymers.

(2) comonomers which behave under conditions of the precipitation polymerization in a different way than the abovementioned glycolmonomethacrylates or glycol monoacrylates, i.e. their polymers are, in the diluting agent used, either completely soluble or swellable to a substantial extent. These latter monomers can be used together with the mentioned glycol monomethacrylates or glycol monoacrylates but in a limited amount of about up to 40% by volume (based on the monomer mixture). Otherwise an agglomeration of the polymer particles may result, and the effectiveness of precipitation could be strongly decreased. Into this latter group of comonomers may be counted particularly: alkylmethacrylates, such as methylmethacrylate, butylmethacrylate, ethylacrylate, and the like; alkoxyalkyl methacrylate or alkoxyalkyl acrylate, such as methoxymethyl methacrylate; other vinyl monomers, such as acrylonitrile, methacrylonitrile, styrene (even in a presence of minor amount of divinylbenzene), vinylacetate, and the like; anhydrides of unsaturated carbonic acids, such as maleic acid anhydride.

Figure 1:
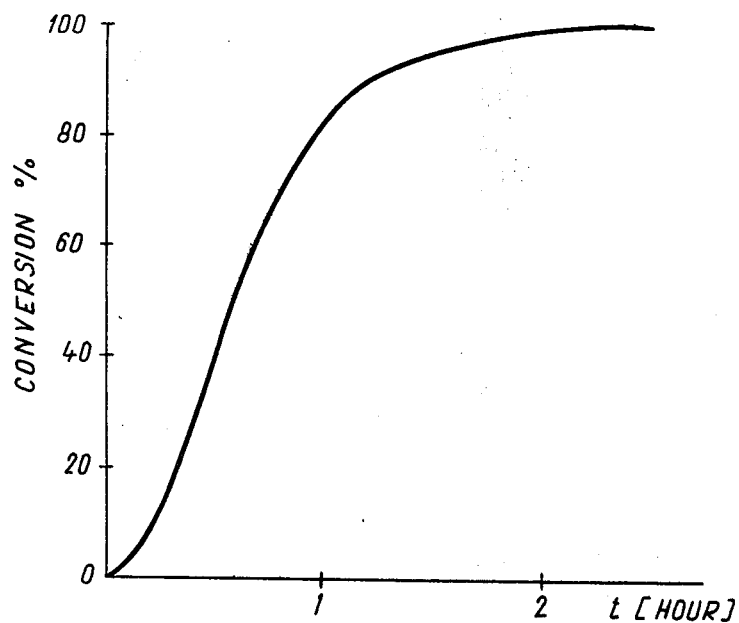
FIG. 1 is a graph showing the percent conversion from monomeric mixture to discrete particulate polymer relative to time under the precipitation polymerization conditions of the present invention.

In FIG. 1 there is represented the conversion curve of the free-radical precipitation polymerization of ethylene glycol monomethacrylate (containing 0.25% by weight of ethylene glycol dimethacrylate), in tetrachloromethane at 80° C. The concentration of the monomer in the polymerization mixture was 10% by volume (at 20° C); the quantity of the polymerization catalyst: 0.25% by weight of dibenzoyl peroxide (based on monomer). The polymerization was carried out in sealed glass ampules under inert nitrogen blanket.

In FIG. 2 there is represented the course of the free-radical precipitation polymerization of ethylene glycol monomethacrylate in chloroform 1, and in di-n-butyl ether 2, both at 70° C. Herein, the relationship of the amount of the soluble polymer (in wt.-% based on the whole polymer product) to a different amount of the cross-linking ethylene glycol dimethacrylate (in % by volume based on the whole volume of the polymerization mixture at 20° C) is shown, at a constant dilution of 90% by volume of the diluting agent. The concentration of the monomer in the polymerization mixture was 10% by volume (at 20° C); the amount of the polymerization catalyst: 0.25% by weight of dibenzoyl peroxide (based on the monomer). Polymerization was carried out in sealed glass ampules under nitrogen atmosphere. The soluble part of the polymer was obtained with an extraction of the polymer product using methanol in the Soxklet's extractor, at the boiling point of methanol during 20 hrs., and by consequent precipitating the polymer solution obtained (tenfold excess use of ether).

Figure 3:
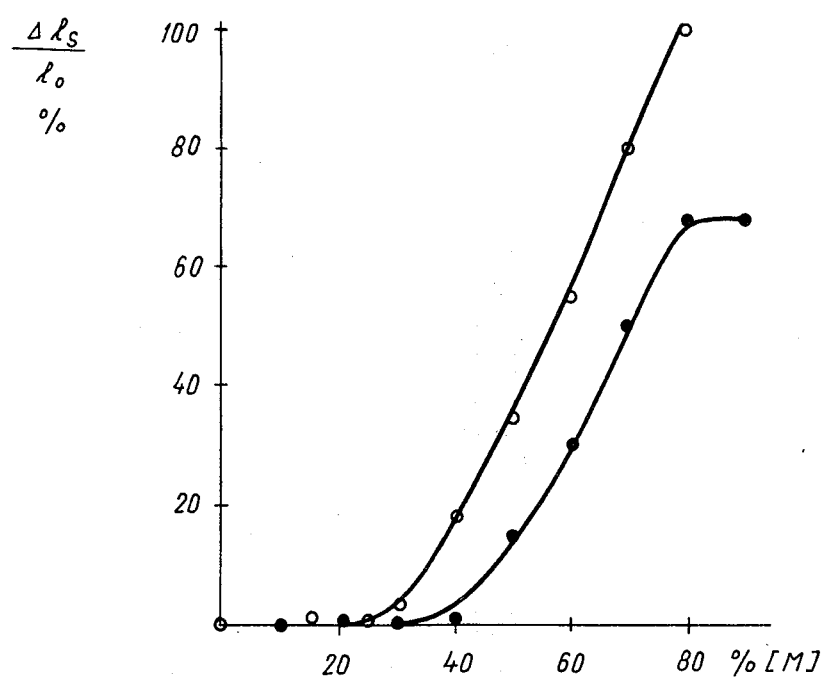
FIG. 3 is a graph showing the result of polymerization in percent swelling of swellable polymer with the use of certain monomers in varying proportions (M) with the total percent by weight of the mixture.

In the FIG. 3 there is represented the graphical relation of the linear swelling of cross-linked copolymers of ethylene glycol monomethacrylate and butyl methacrylate (BMA), and/or butyl acrylate (BA), in benzene at room temperature; with a constant amount of the cross-linking agent (ethylene glycol dimethacrylate: 0.17% by weight, based on the monomer mixture). The empty circles represent butyl acrylate, the closed circles represent butyl methacrylate. Samples of copolymers were obtained by the bulk polymerization of the monomer mixture initiated with 0.25% by weight of dibenzoyl peroxide at 70° C. The swelling of the samples was performed in benzene to the equilibrium, and the values $\Delta$ ls/lo (in %) were obtained, where $\Delta$ ls represents change of the sample length ls at the equilibrium swelling and lo the original length of the copolymer sample. (In the form of rod with a diameter of 2 mm).

From the FIG. 3 is well evident, that with increasing amounts of butyl methacrylate or butyl acrylate in the copolymer, under 40% by weight, the swelling of the copolymer increases sharply, and from this it is possible to derive a qualitative conclusion on the necessity of limiting the amount of such comonomers in the starting monomer mixture. For other diluting agents it is possible to determine analogous relations, as well as, for the other copolymers. The extent of swelling thus provides the value informations on the thermodynamic quality of the diluting-precipitating agents, which can be used according to the invention.

In precipitation polymerization according to the invention it is possible to use still other diluting-precipitating agents namely, aromatic hydrocarbons, such as benzene, toluene o-, m-, p- xylene or a mixture of these isomers; halogenated aliphatic or aromatic, and/or partly hydroaromatic hydrocarbons, such as tetraline, particularly chlorinated or fluorinated hydrocarbons, such as chloroform, tetrachloromethane, trichloroethylene, chlorobenzene, trichlorotrifluoro ethane, and other fluorinated aliphatic hydrocarbons (with the use of low boiling solvents it is necessary to work in a pressure apparatus, however, even this has an advantage in that the drying process of the polymer product thus produced, since the solvent may be easily evaporated); esters of aliphatic and aromatic carbonic acids with uni-functional alcohols, such as ethyl acetate, butyl acetate, amyl acetate, butyl phthalate, dioctyl phthalate, di-iso-octyl phthalate; ethers and cyclo-ethers, such as diethylene glycol dimethyl ether, di-n-butyl ether, dioxane, tetrahydrofurane, triethylene glycol dimethyl ether; ketones and cyclo-ketones, such as acetone, methyl-ethyl ketone, cyclohexanone, and the like; tetraethyl silicone, silicone oils; and different mixtures of these compounds in different proportions.

It is possible to regulate the thermodynamic quality of the diluting-precipitating agent by the addition of aliphatic or cycloaliphatic hydrocarbons, up to 50% by volume, and thus prevent worsening of product quality and consequently make the precipitation of the polymer product much more effective. Herein, petrolether, hexane, cyclohexane, and the like can be used.

The boiling points of these diluting agents can be spread within broad limits. It has been noted that with very volatile solvents it is possible to work in a pressure apparatus (e.g. with diethyl ether, methyl acetate, lower aliphatic fluorinated hydrocarbons, and the like). The polymer product, however, can be dried very easily by evaporating the precipitating agent under the normal conditions. If a diluting agent with a higher boiling point is used, it has an advantage in that it performs the polymerization at a higher temperature, although the polymer product must be then cleaned by a precipitating agent having the lower boiling point. It may sometimes be advantageous to conduct the precipitation polymerization process, using a combination of diluting-precipitating agents having high boiling points, and the added monomer mixture being itself diluted with diluting-precipitating agents having lower boiling points. The added monomer mixture is gradually added in small portions to the warmed precipitating agent of the higher boiling point, and the diluting agent of the lower boiling point is distilled out of the polymerization reactor. This latter agent can be utilized again in the further charge of the monomer mixture, preferably in a continual process.

In practice, it is convenient to use non-flammable solvents of the type of halogenated hydrocarbons, such as chloroform, tetrachloromethane, methylene chloride, trichloro ethylene, trichloro-trifluoro ethane, chlorobenzene, and the like.

An initiator for free-radical polymerization can be added into the starting monomer mixture in amount from 0.1 to 5% by weight (based on the monomer), and if the monomer mixture with the initiator is gradually added into a reactor, the steady-state process, and optimal conditions of the polymerization are thus consequently secured. The temperature of decomposition of the polymerization initiator should be advantageously within a range from 20° to 100° C, in accordance with the diluting agent used. Suitable initiators are, e.g. peroxides, hydroperoxides, azo-compounds, and similar, which give sufficient amount of the effective free-radicals, such as dibenzoyl peroxide, di-isopropyl percarbonate, cumene hydroperoxide, azo-bis-isobutyro nitrile, tert.butyl peroctoate, and similar organic compounds.

The following are several illustrative examples of the present invention. They should not be viewed as all inclusive or limiting.

EXAMPLE 1

5.00 grams of distilled ethylene glycol monomethacrylate (2-hydroxyethyl methacrylate) were weighed into a glass pressure ampule having a 60 cc. content (the monomer had a purity of 97.6% by weight (wt.-%) of the monoester, 0.09 wt.-% of the diester ethylene glycol dimethacrylate, 2 mgr. of water/1 cc. of the monomer, and the rest up to 100 wt.-% was free ethylene glycol). 0.0125 gr. of dibenzoyl peroxide constituting 0.25 wt.-% of the monomer, dissolved in 45 cc. of chloroform, was added to the ampule and the contents were bubbled through with pure nitrogen atmosphere for a period of 1 minute. The ampule was then sealed. The polymerization of the monomer mixture was carried out in a water bath at the temperature of 70°± 0.1° C during a period of 3 hrs. The ampule was then cooled by running cold water about it and consequently, opened. The content of the ampule was subjected to drying under vacuum at a room temperature. 4.9 grs. of a dry polymer powder were obtained that were completely soluble in methanol.

As a control repetition of Example 1 was conducted under the same conditions, except that the monomer contained a concentration of the cross-linking comonomer, comprising about 0.12 wt.-% of ethylene glycol dimethacrylate (based on the monomer). The polymerization resulted in a product comprising 90 wt.-% of soluble polymer and a remainder comprising about i.e. 10 wt.-% of insoluble cross-linked particles (microgels). The insoluble portion of the polymer product (after a dissolution of the polymer product in methanol, a 1% by weight concentration solution was produced) was separated in part by filtration (with use of the paper filter for the analytic quantitative determination of $BaSO_4$) and in part centrifugation. If a 1 wt.-% content of the cross-linking agent in the basic monomer was used, then only 10 wt.-% of the soluble part of the polymer product were obtained, and the rest presented insoluble cross-linked particles that did not pass into a true polymer solution in methanol. The complete dependence of the effect of cross-linking agent on the content of the soluble parts of the polymer under the same conditions of the precipitation polymerization is given in FIG. 2. It is also noted in the copending application aforementioned.

EXAMPLE 2

40 cc. of pure di-n-butyl ether were measured out into the 100 cc. three neck distillation flask that was equipped with a reflux condenser, a thermometer, an inlet for nitrogen, and a dropping receiving funnel. The flask was warmed in a water bath at the temperature of 70°± 0.1° C and the contents constantly stirred by introducing the nitrogen in a small stream. When a temperature was achieved in the flask equal to that in the bath, the charging of the monomer mixture was started. The composition of the monomer mixture as introduced comprised 5.0 grs. of ethylene glycol monomethacrylate (with 1 wt.-% of the cross-linking agent), 5.0 cc. of di-n-butyl ether, and 0.0125 gr. of dibenzoyl peroxide. The charging was carried out in small drops (about 0.03 cc.) over a period of 1 hr. and 25 minutes, and the whole duration of the polymerization was 3 hrs. (from the beginning of charging). The contents of the polymerization flask was then spread onto a glass plate, and dried under vacuum at room temperature until the constant weight was achieved. The polymer product thus obtained was completely soluble in methanol, and did not hold any insoluble microgel particles.

A repetition of the experiment was carried out under the same conditions of the precipitation polymerization, i.e. temperature, time, and the same composition of the starting monomer mixture, but by one-step or batch technique in the glass pressure ampule such as used in Example 1. Only 6 wt.-% of the methanol soluble part of the whole polymer product was obtained. This characterises, critically, the advantage of the gradual precipitation polymerization according to the invention.

EXAMPLE 3

45 cc. of benzene was charged into the glass apparatus used in the Example 2, and the water bath was held at the temperature of 60°± 0.1° C. 5 grs. of the monomer mixture comprising four parts by weight of ethylene glycol monomethacrylate having 0.38 wt.-% of ethylene glycol dimethacrylate, 97.3 wt.-% of the monoester, and 1.6 mgr. of water per 1 cc. of the monomer, 1 part by weight of fresh distilled methacrylic acid, and one-fortieth part by weight of pure azo-bis-isobutyro nitrile (0.5 wt.-% based on both monomers) as a polymerization initiator was gradually added to the flask. The monomer mixture was charged at a rate proportionate to that in Example 2. After the charging of the monomer mixture was finished the funnel was washed with a small amount of benzene (about 5 cc.) into the polymerization flask. The time of the whole polymerization was 2½ hours from the beginning of charging. 4.85 grs. of the copolymer were obtained all of which was completely soluble in lower alcohols, acetic acid, and dimethylformamide.

EXAMPLE 4

The Example 3 was repeated using toluene as the diluting agent. A similar result was achieved.

EXAMPLE 5

60 cc. of tetrachloromethane were measured out into the glass apparatus according to the Example 2, the bath was warmed and held at the temperature of 60°± 0.1° C under an inert atmosphere of nitrogen. 10 grs. of a monomer mixture diluted with 10 cc. of tetrachloromethane was added gradually in substantially equal increments. The monomer mixture had the composition as follows: six parts by weight of ethylene glycol monomethacrylate, four parts by weight of fresh distilled butyl acrylate, and 0.05 part by weight (0.5 wt.-% based on monomers) of di-isopropyl percarbonate as an initiator of the polymerization. A charging time was about 70 minutes. The copolymer thus obtained, contained a portion comprising parts amounting to 9.65 grs., which was rather swelled by tetrachloromethane, and did agglomerate under drying (at room temperature, and with use of vacuum), into bigger bits. Otherwise, the remainder of the polymer product was completely soluble in methanol, ethanol, and isopropanol.

A similar result was achieved under the same conditions of the polymerization with use of chloroform or methylene chloride as the diluting-precipitating agent. If a higher content of the butyl acrylate monomer (above 50 wt.-%) in the polymerization mixture was used, then the precipitation of a copolymer was not effective, and the polymerization had a course of the normal solution polymerization (through an area of a turbid solution).

EXAMPLE 6

60 cc. of silicon oil (Lucoil H) were measured out into the apparatus according to the Example 2, the polymerization flask was warmed at the temperature of 100° C in an oil bath, and the monomer mixture was gradually added in drops, in the total amount of 20 grs. The monomer mixture had the following composition: five parts by weight of diethylene glycol monomethacrylate (with 1.35% of diethylene glycol dimethacrylate), three parts by weight of acrylamide, two parts by weight of butyl methacrylate, 0.1 wt.-part (i.e. 1 wt.-% based on all monomers) of cumene hydroperoxide, and 10 parts by weight of p-xylene used as a diluting agent. The precipitation polymerization from the beginning of charging last 2 hrs., and then a very thick dispersion of the copolymer was filtered out with use of the sintered glass filter, under vacuum. The polymer product on the filter was then washed, first with pure p-xylene, and then with a small amount of benzene. 19.3 grs. of the copolymer was obtained that was completely soluble in lower alcohols, methyl cellosolve, acetic acid (besides others). There was no presence of the cross-linked microgels in the copolymer product.

EXAMPLE 7

The example according to the Example 6 was followed but the starting monomer mixture was diluted with 30 cc. of chloroform was charged into the flask during 70 minutes. The chloroform was continually distilled out of the polymerization mixture, and condensed in a downward gravity condenser. The precipitation polymerization lasted about 2¼ hours. 9.45 grs. of a completely soluble polymer product were obtained, and in addition to it even 24 cc. chloroform were regenerated.

Instead of silicon oil, dioctylphthalate, for example, was successfully used in a similar manner. The copolymer, however, is rather swallen by this diluting agent, but it can be washed out with a small amount of benzene.

EXAMPLE 8

The Example 7 was followed, but the monomer mixture had the following composition: seven parts by weight of glycerol monomethacrylate (with a purity: 87 wt.-% of the monoester, 6.3 wt.-% of the diester, 1.6 wt.-% of triester, and 5.1 wt.-% of free glycerol), three parts by weight of maleic anhydride, and 0.1 part by weight of tert.butyl peroctoate. The polymerization was carried out at the temperature of 80° C, and the resulting polymer product was completely soluble in the corresponding solvents.

EXAMPLE 9

The Example 7 was again followed but the monomer mixture had the following composition: five parts by weight of ethylene glycol monomethacrylate (with 0.38 wt.-% of the diester), two parts by weight of acrylic acid, three parts by weight of ethoxyethyl methacrylate, and 0.1 part by weight of dibenzoyl peroxide. The polymerization was carried out at the temperature of 80° C. Methylene chloride was used as a diluting agent in the amount of 30 cc. The polymer product obtained was again completely soluble in lower alcohols.

The examples introduced above serve merely for an illustration of the applicability of the invention, and their number, of course should not limit the breadth of it. Unless it is stated in a different way, all parts, and percentages are by weight.

What is claimed is:

1. A method of preparing hydrophilic polymers of monomethacrylates and monoacrylates and mixtures thereof completely soluble in lower aliphatic alcohols comprising forming a starting monomer mixture I consisting essentially of a major portion of (1) a monoester of methacrylic or acrylic acids and mixtures thereof and (2) a minor amount of cross-linking comonomers of the corresponding multifold ester of said unit (1), and polymerizing said mixture under conditions of free radical polymerization in the presence of a diluent II to precipitate a hydrophilic polymer product therefrom, said diluent II being a solvent for all of the components of said starting mixture I but not a solvent or swelling agent for the polymer product produced and being selected from the group consisting of aromatic hydrocarbons, halogenated aromatic or aliphatic hydrocarbons, partially hydrogenated aromatic hydrocarbons, esters of aliphatic and aromatic carboxylic acid ethers, cycloethers, ketones and cycloketones, silicones, silicone oils and mixtures thereof, said starting mixture I being gradually combined with said diluent II during the polymerization thereof at such an amount and at such a rate that the unpolymerized concentration of the cross-linking unit (2) is maintained during polymerization under the critical limit of 0.02% by volume, based on the entire volume of the starting mixture I and diluent II so combined, said hydrophilic polymer product being thereby a dry powder substantially uncrosslinked and completely soluble in lower aliphatic alcohols but not in said diluent.

2. The method according to claim 1 wherein the concentration of unit (2) is maintained constant.

3. The method according to claim 1 wherein said concentration is maintained by combining said starting mixture and diluent in gradual charges substantially equal to the rate of precipitation of said polymer product.

4. The method according to claim 1 including the step of adding an initiator for free radical polymerization to said starting mixture and diluent.

5. The method according to claim 3 wherein said starting mixture and diluent are combined in small portions over a period of time and wherein the precipitated polymer product is removed in substantially similar portions.

6. The method according to claim 3 wherein said starting mixture and diluent are combined in a continuous manner over a period of time and the polymer product is removed in substantially similar manner.

7. The method according to claim 3 including the step of regulating the speed at which said starting mixture and said diluent are combined relative to the amount of cross-linking agent below the level to effect the formation of any insoluble polymer product.

8. A composition of matter comprising a soluble polymer made in accordance with the method of claim 1.

9. The method according to claim 1 wherein said unit 1 is glycolmonomethacrylate and glycolmonoacrylate.

10. The method according to claim 1 wherein said polymer is obtained in the form of discrete particles.

11. The method according to claim 1 wherein said unit (2) is glycoldiacrylate.

12. A method according to claim 1 wherein said unit (2) is consumed in the course of said polymerization.

13. The method according to claim 1 further comprising adding as comonomer a member selected from the group consisting of (a) unsaturated carboxylic acids and (b) amides of unsaturated carboxylic acids, (c) aminoalkyl acrylates and methacrylates, (d) N-alkyl aminoalkyl acrylates and methacrylates, (e) N,N-dialkyl aminoalkyl acrylate and methacrylate; and (f) N-vinyl pyrrolidone and mixtures thereof.

14. The method according to claim 13 wherein unit (a) is selected from the group consisting of acrylic-, methacrylic-, itaconic-acid or citraconic acids; unit (b) is selected from the group consisting of acrylamide or methacrylamide; unit (c) is aminoethyl methacrylate; unit (d) is N-methyl aminoethyl methacrylate; and unit (e) is N,N-dimethylamino-ethylmethacrylate.

15. The method according to claim 1 further comprising adding as comonomer up to about 40% by volume of a member selected from the group consisting of (a) alkyl-methacrylates; (b) alkoxyalkyl acrylates or methacrylates; (c) acrylonitrile; (d) methacrylonitrile; (e) vinyl acetate; (f) styrene and (g) maleic anhydrides.

16. The method according to claim 1 wherein up to about 50% by volume of said diluent unit II of an aliphatic or cycloaliphatic hydrocarbon is added to said diluent unit II.

17. The method according to claim 1 wherein unit II is a non-flammable solvent.

18. The method according to claim 4 wherein said initiator is added in amounts of about 0.1 to about 5% by weight.

* * * * *